April 30, 1963   E. L. FRANKE, JR., ET AL   3,087,199
METHOD OF AND APPARATUS FOR REVERSING SPRING CORDS
Filed Dec. 23, 1959                              6 Sheets-Sheet 1

INVENTORS
E. L. FRANKE, JR.
G. E. HARTRANFT
M. W. RICHTER
BY H. J. Winegar
ATTORNEY

April 30, 1963 E. L. FRANKE, JR., ET AL 3,087,199
METHOD OF AND APPARATUS FOR REVERSING SPRING CORDS
Filed Dec. 23, 1959 6 Sheets-Sheet 5

INVENTORS
E. L. FRANKE, JR.
G. E. HARTRANFT
M. W. RICHTER
BY H. J. Winegar
ATTORNEY April 30, 1963 E. L. FRANKE, JR., ET AL 3,087,199
METHOD OF AND APPARATUS FOR REVERSING SPRING CORDS
Filed Dec. 23, 1959 6 Sheets-Sheet 6

INVENTORS.
E. L. FRANKE, JR.
G. E. HARTRANFT
M. W. RICHTER
BY H. J. Winegar
ATTORNEY United States Patent Office 3,087,199
Patented Apr. 30, 1963

3,087,199
METHOD OF AND APPARATUS FOR
REVERSING SPRING CORDS
Edward L. Franke, Jr., Cub Hill, George E. Hartranft, Parkville, and Melvin W. Richter, Perry Hall, Md., assignors to Western Electric Company, Incorporated, New York, N.Y., a corporation of New York
Filed Dec. 23, 1959, Ser. No. 861,663
3 Claims. (Cl. 18—19)

This invention relates to a method of and apparatus for reversing spring cords, and more particularly to a method of and apparatus for stretching spring cords during helix-reversing and overtwisting operations.

Electrical retractile cords, commonly referred to as spring cords, are widely used in the telephone field and in connection with various electrical appliances. A well-known example of such cords is the spring cord utilized to connect the handset of a telephone instrument to the telephone base. The spring cord is formed so that the major portion thereof is in the form of a compact helical coil, which may be extended by slight tension and which will return to the compact form when the tension is relieved.

According to a preferred process of manufacturing spring cords for telephone instruments, a desired length of jacketed, multiconductor cordage is wound in a helix along the length of a rotating and longitudinally moving mandrel, preferably as disclosed in Patent 3,024,497, issued on March 13, 1962 to E. C. Hardesty and D. L. Myers. As disclosed in that application, the cordage is first cut to a predetermined length, and is then tipped and banded before winding on the mandrel. After the winding operation, the trailing end of the cordage is clamped to the mandrel, and then the mandrel with the helically coiled cordage clamped thereto is placed in an oven and heat-treated.

In one type of preferred cordage, the jacketing material comprises a plasticized polyvinyl-chloride composition having elastic properties, as disclosed in Patent 3,037,068, issued on May 29, 1962 to H. L. Wessel. The cord is heated on the mandrel to a temperature above the softening point of the polyvinyl-chloride composition, to relieve strains in the jacketing material and to impart retractility to the cord, and is then cooled to room temperature. After cooling, the heating-treated cord is removed from the mandrel and the pitch of the helix is reversed in order to provide a spring cord having greater retractility, as disclosed in Patent 2,920,348, issued on January 12, 1960 to E. L. Franke, Jr.

As disclosed in the last-mentioned application, an endless conveyor is provided having a succession of opposing, aligned pairs of rotatable clamps mounted thereon for advancement therewith. At a loading station, a succession of spring cords is inserted between the advancing pairs of rotatable clamps, each spring cord being secured at each end by one clamp. The conveyor advances the clamps in synchronism so that the spring cords proceed, in a direction transverse to their lengths, to various operating stations of the machine. At one station along the conveyor, the opposing clamps of each pair are rotated in opposite directions with respect to each other so as to reverse the pitch of the helix of the spring cord and so as to impart a predetermined overtwist to the reversed spring cord. At an overtwist-removing station, relative rotation of the clamps of each pair thereof is caused in the opposite direction to that of the reversing and overtwisting operation in order to remove substantially all of the overtwist. As the spring cords pass through the helix-reversing and overtwisting station, means provided with cord-engaging fingers engage the cord at an intermediate point and stretch the cord. The advantages of the reversing and overtwisting operations are disclosed in Patent 2,920,351, issued on January 12, 1960 to E. C. Hardesty and D. L. Myers.

It is an object of this invention to provide a new and improved method of and apparatus for making spring cords.

It is another object of this invention to provide a new and improved method of and apparatus for stretching spring cords during helix-reversing and overtwisting operations.

It is a further object of this invention to provide a new and improved method of and apparatus for stretching a spring cord by controlled, varying amounts during helix-reversing and overtwisting operations to produce a finished spring cord.

A method of reversing the coils of a spring cord, which illustrates certain features of the present invention, may include the steps of gripping the ends of a spring cord having a helically coiled portion formed from jacketed cordage and twistingly rotating the end relative to each other until the direction of all the coils is reversed. The coiled portion is stretched during the end-rotating step so that the length of the coiled portion increases uniformly during at least a substantial portion of the end-rotating step.

Apparatus illustrating certain features of the invention may include means for gripping the opposite ends of such a spring cord and for twistingly rotating the ends relative to each other until the direction of all of the coils is reversed. Means are provided for stretching the helically coiled portion of the spring cord by increasing amounts as the ends are rotated relative to each other, so that the length of the coiled portion increases uniformly during a substantial first portion of the total rotations required to accomplish the helix reversal.

Other objects, advantages and aspects of the invention will appear in the following detailed description of specific methods and apparatus embodying the invention, when read in conjunction with the appended drawings, in which.

Figure 1:
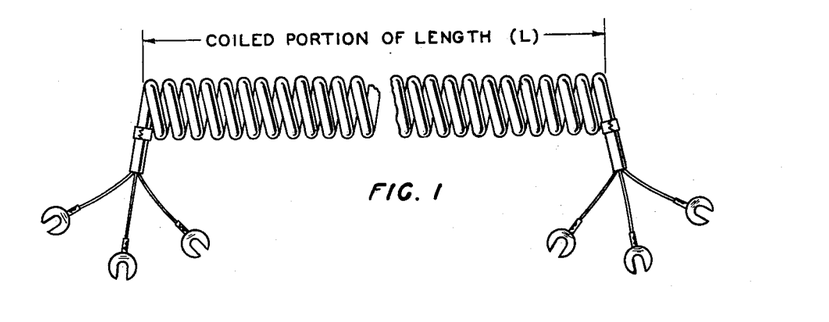
FIG. 1 is a representation of a spring cord in a relaxed state, after heat treatment and removal from a mandrel on which the spring cord was formed, the representation being primarily for the purpose of nomenclature.
Figure 2:
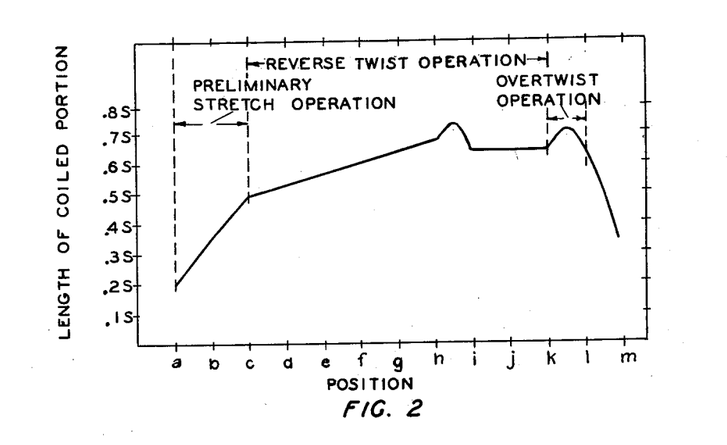
FIG. 2 is a chart illustrating graphically the length of a coiled portion of the spring cord at successive positions of the ends of the cord, according to one specific example.
Figure 3:
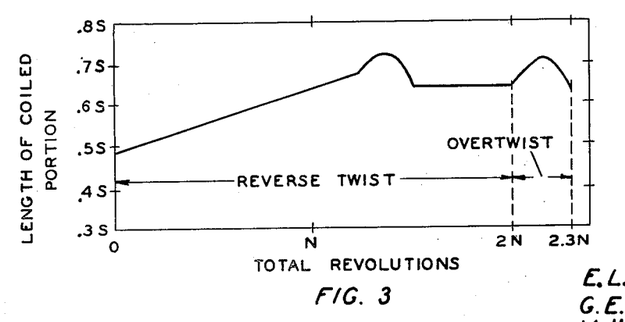
FIG. 3 is a graph of the length of the coiled portion versus total revolutions of the ends of the cord, according to a specific example.

Referring now in detail to the drawings, FIGS. 1 to 3, inclusive, illustrate methods of stretching spring cords by controlled, varying amounts during helix-reversing and overtwisting operations. In the following description, it will be assumed for purposes of illustration that the spring cords have been formed by a process similar to that disclosed in the aforementioned Hardesty et al. Patent 3,024,497, and that the spring cords have been manufactured of the materials similar to those disclosed in the aforementioned Wessel Patent 3,037,068, heat treated, then removed from the mandrels, and the coils of the helically coiled portion separated. The latter step is necessary due to the tendency for adjacent coils to stick together during the heat-treating operation.

In one specific illustrative example, the coiled portion of a spring cord, immediately after removal from the mandrel with the coils separated and in a relaxed condition, contains approximately 70 inches of elastic-jacketed cordage having a nominal outer diameter of approximately 3/16 inch, slightly flattened so as to be thicker in the direction of the length of the helix. This 70 inch length of cordage has been wound into a right-hand helix having 48 coils, an outside diameter of approximately ½ inch and a relaxed length $L_a$ of 13.5 inches. The coiled portion of the spring cord will extend under its own weight to a length of 19 inches.

At the completion of the process hereinafter to be described, the coiled portion of the finished spring cord is formed from the same approximately 70 inch length of cordage, but is wound into a left-hand helix having 42 coils, an outside diameter of approximately ⅝ inch, and the coiled portion has a relaxed length of approximately 9.5 inches. The coiled portion of the finished spring cord will extend under its own weight to a length of 10 inches.

The initial number of coils (i.e., the number of coils at the start of the process) in the coiled portion of the spring cord is an important factor in the process, and this number will hereinafter be referred to as "N." The uncoiled length (approximately 70 inches) of cordage contained in the coiled portion of the starting spring cord, assuming that the cord were uncoiled and drawn out perfectly straight, is another important factor and this uncoiled length will be referred to as "S."

During the process, the ends of the spring cord are clamped and relative rotation is effected between the clamped ends of the cord such as to reverse the helix of the spring cord and then overtwist the reversed cord. It has been found that 2N total revolutions are required to unwind the original helix and rewind the same in the opposite direction with the original number (N) of coils. The first 2N revolutions will be referred to as constituting the "helix-reversing operation" while every revolution in excess of 2N will be considered as the "overtwisting operation," although preferably these operations are performed in immediate succession. Each additional revolution in excess of 2N serves to impart one additional coil in the reversed cord, with the diameter of each coil being reduced by a proportional amount. In practice, it has been found expedient to rotate the ends of the cord through between 2.1N and 2.5N revolutions, preferably about 2.3N revolutions.

In the specific example given, each end of the cord is rotated through 48 revolutions, making a total of 110 revolutions. Since the starting spring cord had 48 coils, the first 96 revolutions function to rewind the spring cord into a completely reversed spring cord having 48 left-hand coils of approximately ½ inch outer diameter. The remaining 14 revolutions serve to overtwist the reversed cord into an overtwisted spring cord having 62 left-hand coils of approximately 7/16 inch outer diameter.

Later, substantially all of the overtwist is removed from the spring cord and the ends thereof are unclamped, so that the spring cord may assume a relaxed configuration, the finished spring cord having a number of coils depending on the type of cordage used and the preceding operations, particularly the winding on a mandrel and the overtwisting step. In practice, it has been found that the final number of coils is somewhat less than the original number, 42 versus 48 in the instant example.

Figure 4:
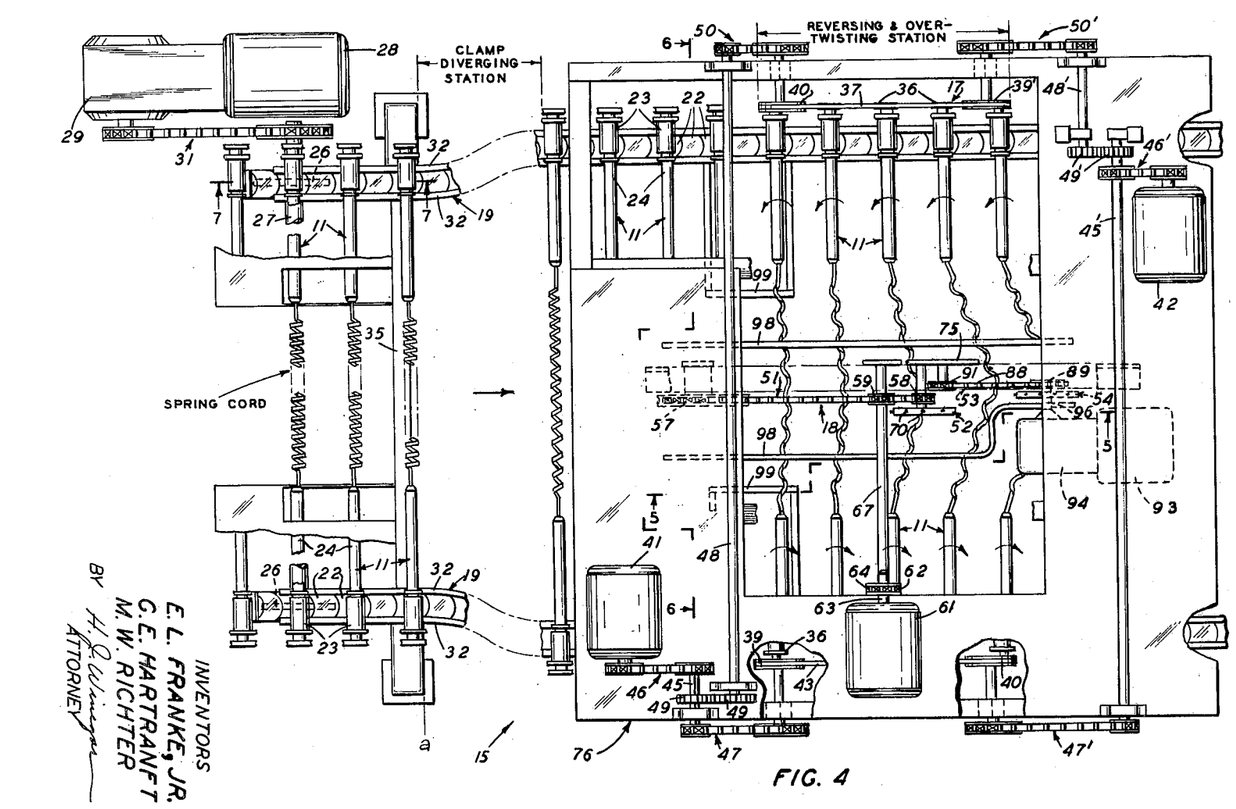
FIG. 4 is a top plan view of a spring-cord working machine embodying certain principles of the invention, with parts thereof broken away for clarity.
Figure 5:
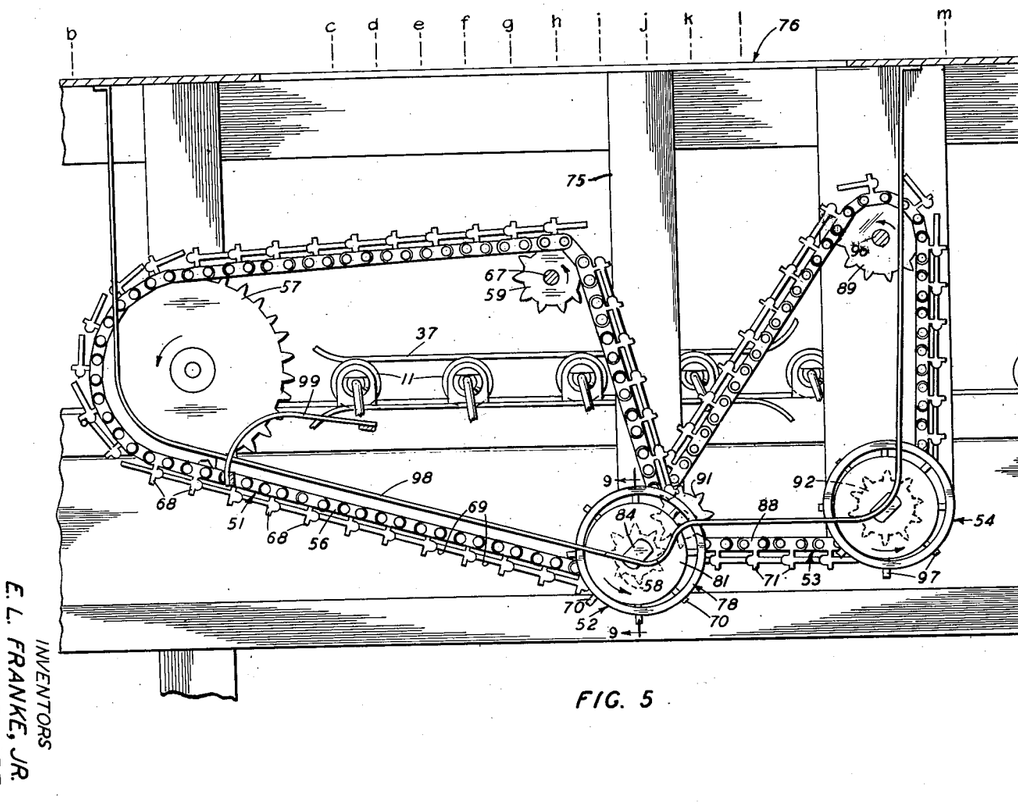
FIG. 5 is an enlarged, fragmentary, vertical section of a portion of the machine illustrated in FIG. 4, with parts broken away, taken generally along line 5—5 of FIG. 4, and illustrating particularly a stretching mechanism.

According to a preferred procedure, at an initial loading position "a" (FIG. 4), the ends of the spring cord are clamped, as between a pair of opposed aligned clamps, designated generally by the numerals 11—11. The clamps 11—11 are then advanced in alignment with each other from left to right, as viewed in FIG. 4, so as to carry the clamped cord transversely of its length along a predetermined path. This path is preferably horizontal, and various positions of the clamps 11—11 along the path are designated by the letters "a" through "m" (FIGS. 4 and 5). While the cord might be maintained stationary during the helix-reversing and be stretched by varying amounts according to the invention, it is preferred to advance successive cords along the same predetermined path so as to permit conveyorized operation of the process utilizing the apparatus to be described hereinafter.

Between the position "a" where the ends of the cord are clamped and a position "c" where the clamps 11—11 begin to rotate to start the helix-reversing operation, the coiled portion of the spring cord is stretched from the relaxed length $L_a$ of 13.5 inches (0.19S) to a length $L_c$ of about 34 inches (0.49S). This stretching between the positions "a" and "c" is designed to prepare the cord for the helix-reversing operation and will be referred to as the "preliminary stretch." The preliminary stretch may be accomplished by moving the clamps 11—11 away from each other, by pulling the center of the cord away from the clamped ends so as to deform the cords into a bent configuration, or by a combination of these two methods. In practice, it is preferred to extend the coiled portion of the spring cord to a length of about 25.5 inches (0.36S) by diverging the clamps 11—11, and to achieve the remainder of the preliminary stretch by pulling an intermediate of the spring cord away from the clamped ends. For this purpose, the clamps 11—11 are diverged between the position "a" and a position "b" until the length of the coiled portion is 25.5 inches, and then the center of the cord is pulled away from the clamped ends thereof between the positions "b" and "c" until the length $L_c$ of the coiled portion is 34 inches.

The pulling-away step is best accomplished by engaging the cord at an intermediate point therealong with a cord-engaging finger engaging the spring cord at a midpoint thereof. The finger is moved downward with respect to the clamps 11—11 to pull the spring cord into a bent configuration and in the same direction that the clamps 11—11 are advancing so that the midpoint will travel in the same direction as the clamped ends. Preferably, the speed component of the finger in the horizontal direction is somewhat greater than the speed of the clamps 11—11 before the start of the helix-reversing operation which commences at position "c," so that the midpoint of the spring cord leads the clamped ends thereof (see FIG. 5).

Between the position "c" and the position "k," the clamps 11—11 are rotated in opposite directions to each other so as to reverse the helix of the cord. As viewed from the front of FIG. 5, for cords having an initial right-hand helix as illustrated, the front clamp 11 is rotated in a clockwise direction and the rear clamp 11 is rotated in a counterclockwise direction, preferably at the same speed. Between the positions "c" and "k," each clamp is rotated through 48 revolutions (a total of 96 revolutions), and at the position "k," the spring cord is fully reversed and contains 48 left-hand coils.

During the first few revolutions of the clamps 11—11 (about the first 6 to 9 revolutions of each clamp depending to some extent on the amount of stretching), the right-hand helices in the starting cord open up until a critical diameter is reached; that is, the coils become fewer in number and larger in diameter. In the example given, between the position "c" and a later position "d" corresponding to about 7 revolutions of each clamp (i.e. 14 revolutions total), the right-hand coils reduce in number to 34 (14 less) having an outer diameter of approximately ¾ inch, and a first left-hand coil begins to wind adjacent to each of the clamped ends.

Between the position "d" where reversed coils begin to wind and the position "k" where the helix is completely reversed, the large right-hand coils maintain approximately the same critical diameter and small left-hand coils form proceeding toward the center from the clamped ends. The spring cord at positions "e," "f" and "g" has 0.5N, 0.75N and N revolutions, respectively, imparted thereto.

The position "g" is what is termed the "null position"; that is, the point where the first N revolutions have been completed and where, theoretically, there would be no net coils remaining in the cord if the cord were pulled out perfectly straight. Actually, however, there are a total of approximately 17 of the small left-hand coils, half at each end, covering about ⅓ of the stretched length of the spring cord and approximately 17 of the large right-hand coils covering the central ⅔ of the cord length.

Between the null position "g" and the complete-reversal position "k," the small left-hand coils continue winding inward from both ends until, at the position "k," there are none of the large right-hand coils remaining. At this position, the spring cord contains only small left-hand coils. At positions "h," "i" and "j" the total revolutions equal 60, 72 and 84 (1.25N, 1.5N and 1.75N), respectively.

During a first substantial portion of the helix-reversing operation, preferably for the first approximately N to 1.25N revolutions, the spring cord is stretched by uniformly increasing amounts. In the specific example, the spring cord is stretched from the length $L_c$ of 34 inches at the position "c" to a length $L_h$ of about 46.8 inches (0.67S) at the position "h" corresponding to 60 revolutions (1.25N). The finger is moved down and to the right (FIG. 5) at such a speed that the length of the spring cord increases substantially uniformly by the prescribed amounts, preferably with the midpoint leading the ends of the cord by increasing amounts. It has been found that the helix-reversing operation is greatly facilitated in this manner, and that the reversed coils, having a small-diameter, wind smoothly and neatly inward from both clamped ends with substantially no tangling or winding of the coils one on top of the other.

At about the end of the increasing length period just described, the spring cord is rapidly stretched additionally for a short time and is then released quickly back to a lesser stretched condition. In the specific example, the spring cord is stretched additionally from the length $L_h$ of 46.8 inches (0.67S) at the position "h" to a maximum length of 51 inches (0.73S) and is then released to a length $L_i$ of 45 inches (0.64S) at the position "i." This rapid, additional stretching serves to unkink the cord and straighten out any irregularities which may have occurred in the cord up to that point. The additional stretching may be accomplished by moving the finger rapidly down and then back up.

The length of the spring cord is then maintained substantially constant during the remainder of the helix-reversing operation, between the positions "i" and "k." In the specific example, the length $L_i$ of the cord at the position "i" is 45 inches (0.64S) and the length $L_k$ at the position "k" is also 45 inches. This is accomplished by moving the finger parallel to the path of the clamps 11—11 at the same speed.

After the completion of the helix-reversing operation, the length of the spring cord is again increased progressively during the major portion of the overtwisting operation. In the specific example, the cord is increased from the length $L_k$ of 45 inches (0.64S) at the position "k" to a maximum length of 49.5 inches (0.71S) prior to the end of the overtwisting operation at the point "l." This additional stretching prevents the coils from tangling during overtwisting, and insures that the stresses and strains resulting from the overtwisting step are distributed uniformly along the length of the cord so that each coil becomes progressively smaller in diameter as the new coils are formed.

After the overtwisting operation has been completed, between the position "l" and a later position "m," the finger is disengaged from the spring cord which then springs back into a generally horizontal position. As previously discussed, the cord is then twisted in the opposite direction to remove the overtwist, and then the clamps 11—11 are converged and the finished spring cord is removed. No additional stretching is required during the overtwist-removing operation, since the number of coils is diminishing.

In FIG. 2, there is shown a chart of the length L of the coiled portion of the spring cord at various positions "a" through "m" according to the specific example given hereinbefore. As indicated, a starting cord having a coiled portion with a relaxed length $L_a$ of 13.5 inches is clamped at the position "a"; the coiled portion is stretched to a length of 25.5 inches between the positions "a" and "b" by diverging the clamps 11—11; is stretched by the mechanical finger to a length $L_c$ of 34 inches between the positions "b" and "c"; is stretched by uniformly increasing amounts up to a length $L_h$ of 46.8 inches between the positions "c" and "h" the first 60 total revolutions; is stretched rapidly to a maximum length of 51 inches and then released quickly to a length $L_i$ of 45 inches between the positions "h" and "i" (60–72 revolutions); is maintained at a length of 45 inches between the positions "i" and "k," ending at a length $L_k$ of 45 inches at the position "k" where the helix-reversing operation is completed (96 revolutions); is stretched by increasing amounts up to a maximum length of 49.5 inches between the points "k" and "l" during the major portion of the overtwisting operation; is released to a length of 22 inches at the position "m"; is maintained by the clamps 11—11 at approximately 22 inches during the subsequent overtwist-removing operation; and is finally released by the clamps 11—11 after the overtwisting operation, where the coiled portion of the finished spring cord has a relaxed length of 9.5 inches.

FIG. 3 is a generalized form of the helix-reversing and overtwisting portions of the specific chart illustrated in FIG. 2, wherein L, the length of the coiled portion of the spring cord at any time expressed in terms of S, is illustrated as a function of the total number of revolutions expressed in terms of N. While the specific graph of FIG. 3 illustrates the most preferred conditions, it should be apparent that various ranges may be utilized within the methods of the invention.

It may be seen that the cord is stretched by substantially uniformly increasing amounts during a first major portion of the helix-reversing operation, preferably during the first N to 1.25N revolutions. In the rapid stretching step between points "h" and "i," the maximum stretched length of the spring cord in a preferred method is 8% greater than either $L_h$ or $L_i$, but may fall within the range of between 3% to 15%. The sudden shock induced by this rapid stretching step straightens out any irregularities in the rewinding and unkinks the cord.

The lengths $L_i$ and $L_k$ are approximately equal to each other, and are equal to or slightly less than $L_h$. Thus the length of the cord is maintained substantially constant at the value $L_1$ during the remainder of the helix-reversing operation.

The maximum stretched length of the cord between points "$k$" and "$l$" should preferably be at least 10% greater than $L_k$. Thus, the cord is stretched additionally during the major portion of the overtwisting operation so as to enhance the properties of the finished spring cord.

Referring now in detail to FIGS. 4 to 10, inclusive, portions of a conveyorized spring-cord working machine are illustrated. This machine includes a mechanism, illustrative of the principles of the present invention, for stretching a succession of advancing spring cords during reversal and overtwisting of the helices thereof in accordance with the methods described hereinbefore with respect to FIGS. 1 to 3, inclusive. As illustrated in FIG. 4, a main conveyor, designated generally by the numeral 15, is provided for advancing a continuous succession of spring cords transversely of their lengths from left to right.

A plurality of the aligned pairs of rotatable clamps 11—11, are mounted on the conveyor 15 for advancement therewith. At a loading station (position "$a$") near the left end of the machine as viewed in FIG. 4, an operator fastens both ends of each of a succession of spring cords between the advancing, aligned pairs of clamps 11—11. The clamps 11—11 then carry the spring cords through various cord-working stations along the machine, including a helix-reversing and overtwisting station illustrated at the right of FIG. 4. A specific construction for the main conveyor 15 and the clamps 11—11 will be described in detail hereinafter under the heading "Main Conveyor 15."

As indicated by phantom lines in FIG. 4, a clamp diverging station is provided after the loading station to move the clamps 11—11 of each pair apart through a predetermined distance designed to impart the preliminary stretch to each spring cord as described hereinbefore. Various other cord-working mechanisms may be located between the clamp-diverging station and the helix-reversing and overtwisting station. For example, a mechanism (not shown) is preferably provided after the diverging station for temporarily stretching the cord rapidly to a high degree to pull apart adjacent coils of the cord, which convolutions tend to stick together as a result of the heat-treating operation. The use of such a mechanism would obviate the necessity of separating the coils of a spring cord before the spring cord is loaded into the cord-working machine. Such mechanisms, designed for use as a part of the subject cord-working machine, are disclosed both in Patent 2,994,511, issued to M. W. Richter and D. G. Stetka on August 1, 1961 and in Patent 2,994,512, issued to E. L. Franke, Jr. on August 1, 1961.

Means, designated generally by the numeral 17, are provided at the helix-reversing and overtwisting station for rotating the clamps 11—11 of each pair in opposite directions for a predetermined number of revolutions, as described previously, so as to reverse the coils of the cords and then to overtwist the cords by a governed amount. A preferred form of rotating means 17 will be described hereinafter under the heading "Clamp Rotating Means 17."

Before and during the helix-reversing and overtwisting operations, a mechanism, designated generally by the numeral 18 and illustrating certain principles of the present invention, functions to stretch the spring cords by the predetermined varying amounts described hereinbefore. The mechanism 18 will be described in detail hereinafter as "Stretching Mechanism 18."

After the helix-reversing and overtwisting operations have been completed, the stretching mechanism 18 releases the cords, which then pass to the right, as viewed in FIG. 4, to an overtwist-removing station (not shown) wherein a preselected, substantial amount of the overtwist is removed. Such a station may be as disclosed in the E. L. Franke, Jr. Patent 2,920,348, and may include means, similar to the rotating means 17, for rotating at least one clamp 11 in each pair in the opposite direction to that in which such clamp was rotated during the helix-reversing and overtwisting operations. From the overtwist-removing station, the spring cords pass to a converging station (not shown) along the conveyor 15, wherein the clamps 11—11 of each pair are moved toward each other. After this, the finished spring cords are removed from between the clamps 11—11 and are packaged in a suitable manner.

Main Conveyor 15

Figure 6:
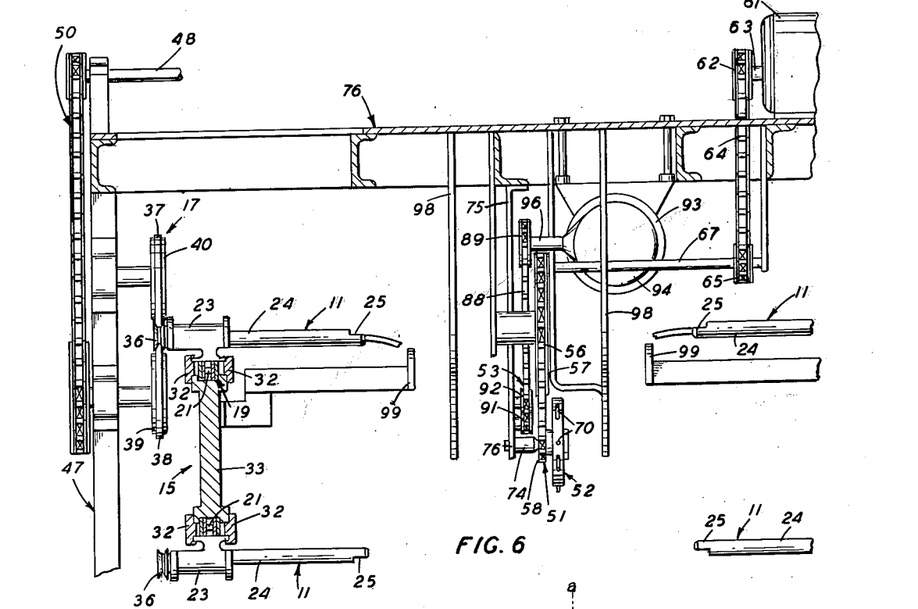
FIG. 6 is an enlarged, fragmentary, vertical section of a portion of the apparatus illustrated in FIG. 4, taken generally along the line 6—6 of FIG. 4, and illustrating portions of the stretching mechanism and portions of a main conveyor.
Figure 7:
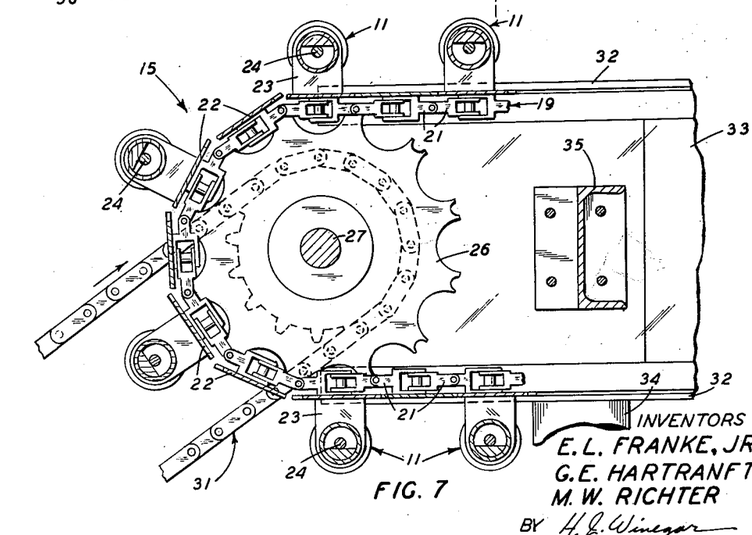
FIG. 7 is a fragmentary, enlarged vertical section, taken generally along the line 7—7 of FIG. 4, and illustrating portions of the main conveyor.

The main conveyor 15 is best illustrated in FIGS. 4, 6 and 7, and includes two endless chains, designated generally by the numerals 19—19, one on each side of the machine illustrated in FIG. 4. As best illustrated in FIGS. 6 and 7, each of the chains 19—19 is made up of a plurality of pivotably connected links 21—21. A flat plate 22 is secured to the outer surfaces of alternate ones of the links 21—21, and every other one of the plates 22—22 carries a housing 23 of an associated one of the clamps 11—11. Each of the clamps 11—11 also includes a shaft 24 rotatably journalled in the housing 23 and a clamping jaw 25 at the inner end of the shaft 24. The clamping jaws 25—25 are designed to secure the ends of the spring cords during all of the cord-working operations, even though the cords are stretched considerably during some of the operations.

The links 21—21 of each chain 19 pass around a driven sprocket 26 at the left end of the apparatus, as viewed in FIGS. 4 and 7, and about an idler sprocket (not shown) at the right end of the apparatus. The sprockets 26—26 are keyed to a common shaft 27, and are driven from a drive motor 28 through a gear reducer 29 and a sprocket-and-chain transmission, designated generally by the numeral 31. With this arrangement, the opposing clamps 11—11 of each pair are always aligned horizontally so as to advance a continuous succession of the spring cords, transversely of their lengths and in generally horizontal attitudes, through the various operating stations along the machine.

The distance between the opposing clamps 11—11 of each pair at any point along the line of advancement of the spring cords is controlled by providing a pair of guide rails 32—32 for each of the chains 19—19. Since it is desired to diverge the clamps 11—11 of each pair so as to stretch the spring cords somewhat, previous to the advancement thereof to the various operating stations and especially before advancement to the helix-reversing station, the rails 32—32 diverge uniformly outward on both sides of the machine.

In the embodiment illustrated, as best seen at the left of FIG. 6, two identical pairs of the rails 32—32 are secured to the top and bottom of a rail support 33 having an I-channel cross section and being curved to fit the desired path (FIG. 4) of the conveyor chains 19—19. The upper rails 32—32, shown in FIG. 6, receive and guide the upper or operating runs of the chains 19—19, while the lower rails 32—32 receive and guide the lower or return runs of these chains. One rail support 33 is provided at each side of the machine, and these supports 33—33 provide the main supporting structure for the conveyor 15. The supports 33—33 are mounted above the floor on suitable standards 34—34, one of which is illustrated in FIG. 7. Also, a number of transverse strengthening members 35—35 (FIGS. 4 and 7) are secured between the rail supports 33—33 at spaced intervals along the length of the machine to provide a rigid, integral supporting structure.

Clamp Rotating Means 17

Figure 8:
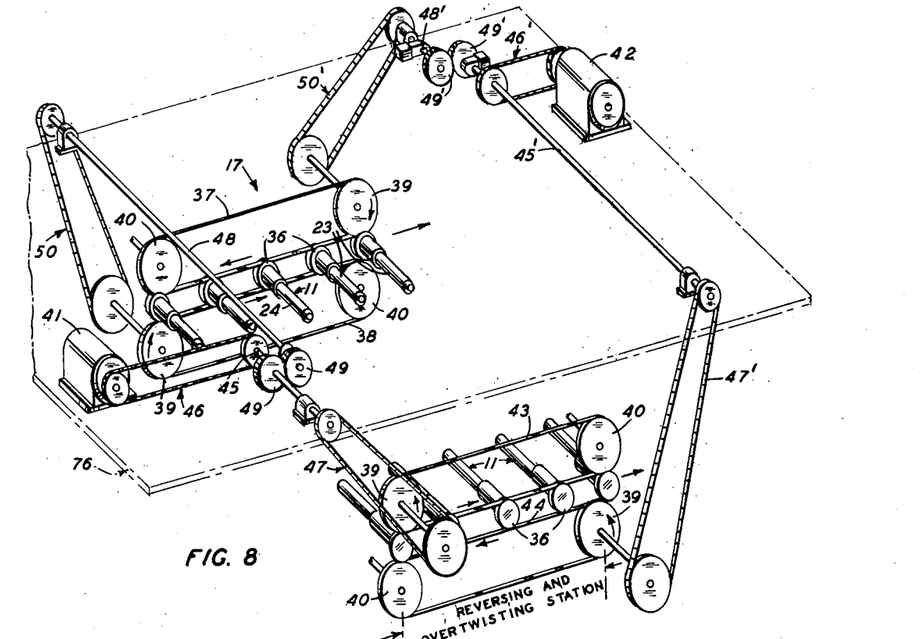
FIG. 8 is a schematic, perspective view of clamp-rotating means, with other portions of the apparatus omitted for clarity.

The means 17 for rotating the clamps 11—11 of each pair in opposite directions so as to reverse the coils of the spring cords and to overtwist them is illustrated in schematic perspective in FIG. 8, with portions of the structure being also illustrated in FIGS. 4, 5 and 6. As illustrated, each of the rotatable shafts 24—24 of the clamps 11—11 is provided with a grooved pulley 36 at the outer end thereof which, when rotated, functions to rotate the shaft 24 within the housing 23, thus causing rotation of the clamping jaw 25 and the clamped end of the cord.

As the advancing clamps 11—11 carry the spring cords through the helix-reversing and overtwisting station, the upper grooved surface of each pulley 36 on one side of the machine illustrated in FIGS. 4 and 8 (the left side as viewed in FIG. 6) is engaged frictionally by a continuously running upper belt 37, and the lower grooved surface thereof is similarly engaged by a continuously running lower belt 38. Each of the belts 37 and 38 travels in a closed path around a driven pulley 39 and an idler pulley 40.

As illustrated in FIGS. 5 and 8, the operative lower run of the upper belt 37 travels from right to left and the operative upper run of the lower belt 38 travels from left to right; therefore, the two belts 37 and 38 cooperate to rotate the associated clamp shafts 24—24 in a counterclockwise direction, as required to reverse the convolutions of the spring cords originally wound in a right-hand helix. For purposes of clarity in illustrating the stretching mechanism 18, the belts 37 and 38 have been broken away in FIG. 5, and the pulleys 39—39 and 40—40 and the driving mechanism therefor have not been illustrtaed.

Since the operative upper run of the lower belt 38 travels in the same direction that the clamps 11—11 are advancing, the linear speed thereof must be equal to the speed necessary to cause the desired rotation ($\omega$) of the pulleys 36—36 (of diameter $d$) plus the linear speed ($v$) of the pulleys 36—36. Thus, the speed of the lower belt 38 must be set equal to $\pi d\omega + v$. Conversely, the operative lower run of the upper belt 37 travels in the opposite direction from that in which the clamps 11—11 are advancing and the linear speed thereof must be set equal to $\pi d\omega - v$. For this reason, a first adjustable-speed motor 41 is provided for driving the lower belt 38 at the predetermined, relatively fast speed, and a second adjustable-speed motor 42 is provided for driving the upper belt 37 at a predetermined, relatively slow speed which is $2v$ slower than that of the lower belt 38.

At the near side of the machine as viewed in FIGS. 4 and 8, the pulleys 36—36 of the clamps 11—11 on that side are similarly engaged by an upper belt 43 and a lower belt 44, each of which passes around an associated driven pulley 39 and an associated idler pulley 40. The belts 43 and 44 function in the same manner as the belts 37 and 38 at the far side of the machine, except that the belts 43 and 44 are driven in opposite directions to the corresponding belts 37 and 38 so as to rotate the associated clamp shafts 24—24 in the opposite direction. Thus, the upper belt 43 is a fast belt and is driven from the motor 41, while the lower belt 44 is a slow belt and is driven from the motor 42.

Considering now the driving connections between the motors 41 and 42 and the various driven pulleys 39—39 and referring particularly to FIGS. 4 and 8, the fast motor 41 drives a first shaft 45 through a sprocket-and-chain transmission, designated generally by the numeral 46, and the driven pulley 39 of the front upper belt 43 is driven from the shaft 45 through a sprocket-and-chain transmission, designated generally by the numeral 47. A countershaft 48 is driven from the shaft 47, in the opposite direction thereto, through a pair of 1:1 reversing gears 49—49, and the driven pulley 39 of the rear lower belt 38 is driven from the countershaft 48 through a sprocket-and-chain transmission, designated generally by the numeral 50.

With this arrangement, it will be observed that the two fast belts 38 and 43 are driven at the same speed and in opposite directions by the fast motor 41. The two slow belts 37 and 44 are driven at equal speeds in opposite directions by the slow motor 42 through corresponding elements 45', 46', 47', 48', 49'—49' and 50'.

The speeds of the motors 41 and 42 are independently adjusted to such values, depending on the speed of the main-conveyor motor 28 and the number of coils in the spring cord being processed, that the coils of the spring cords are completely reversed and a desired amount of overtwist is imparted thereto during the time interval the pulleys 36—36 contact the belts 37, 38, 43 and 44. These speeds may either be calculated in advance, or set empirically while the machine is running, to achieve the desired results.

*Stretching Mechanism 18*

The stretching mechanism 18 is best illustrated in FIGS. 4, 5 and 6 and includes, generically: a first stretching conveyor, designated generally by the numeral 51, designed for engaging an intermediate point along each spring cord before the start of the helix-reversing operation and for stretching the cord by increasing amounts during a first portion of the helix-reversing operation; a first transfer wheel, designated generally by the numeral 52 (illustrated in detail in FIGS. 9 and 10), designed for receiving each spring cord from the first stretching conveyor 51 and for rapidly stretching the cord additionally; a second stretching conveyor, designated generally by the numeral 53, designed for receiving each spring cord from the first transfer wheel 52 and for stretching the cord by a substantially constant amount, as described previously with respect to the methods of the invention, during the remainder of the helix-reversing operation; and a second transfer wheel, designated generally by the numeral 54, similar to the wheel 52, designed for receiving each spring cord from the second stretching conveyor 53, for stretching the cord additionally during the major portion of the overtwisting operation, and for releasing the cord after the overtwisting operation has been completed.

As best illustrated in FIG. 5, the first stretching conveyor 51 includes an endless chain 56 passing counterclockwise in a continuous, closed path around each of three sprockets 57, 58 and 59. The sprocket 59 is driven from an adjustable-speed motor 61 (FIGS. 4 and 6) through a sprocket 62 on the motor shaft 63, a chain 64 passing around both the sprocket 62 and another sprocket 65 (FIG. 6), and a shaft 67 on which are mounted both the sprocket 65 and the driven sprocket 59 of the conveyor 51. Suitable conventional means (not shown) are provided for taking care of chain slack.

As best shown in FIG. 5, the conveyor chain 56 is provided with a plurality of cord-engaging fingers 68—68 projecting outward therefrom at spaced intervals therealong. The sprockets 57, 58 and 59 are so mounted that the fingers 68—68 cross the path of the advancing spring cords near the midpoints thereof as the fingers travel in a counterclockwise direction around the sprocket 57 at the left of FIG. 5. As the fingers 68—68 cross the path of the spring cords, each cord in turn is engaged or picked up at the intermediate point therealong by an oncoming one of the fingers and is carried thereby downwardly and to the right, as viewed in FIG. 5. The fingers 68—68 are relatively closely spaced with respect to the spacing between cord clamps 11—11, so that each spring cord in the series is picked up substantially as it approaches the sprocket 57 and with very little time delay. Thus, the operating cycle is substantially the same for each spring cord regardless of the speed ratio between the main conveyor 15 and the first stretching conveyor 51. This is also true with respect to corresponding cord-engaging members of the transfer wheels 52 and 54 and the second stretching conveyor 53.

As each spring cord is engaged by one of the fingers 68—68, the cord is pulled from the intermediate point into a bent configuration to stretch the cord. The stretched spring cord exhibits a tendency to return to its original configuration, and will thus exert an upward force which functions to hold the cord against a flat outer surface 69 of the conveyor 51. However, the spring cord is not clamped or tightly engaged and may shift its position axially on the surface 69. Also, the coils of the spring cord may be reversed at the contact point with the surface 69.

One of the fingers 68—68 engaging or contacting the cord 10 maintains continuous engagement with the spring cord from the point where that finger passes around the sprocket 57 to almost the point where that finger begins to pass around the sprocket 58. The operating or contacting run of the chain 56 is thus the lower run between the sprockets 57 and 58, where the chain advances downward at an angle of between about ten and twenty-five degrees, preferably about fifteen degrees with respect to the horizontal path of the clamps 11—11, to stretch the cord by constantly increasing amounts during the interval of engagement of the spring cords with the first stretching conveyor 51.

The speed of the conveyor 51 is so set, with respect to the speed of the advancement of the cord clamps 11—11, that the fingers 68—68 travel substantially faster than the clamps and the intermedite points along the cords lead the clamped ends thereof by constantly increasing amounts during the interval of engagement with the conveyor 51 to stretch the cords additionally. It should be noted that the fingers 68—68 pick up the spring cords a substantial distance in advance of the start of the helix-reversing operation, so that cords will have been stretched by a predetermined amount before the start of the helix-reversing operation. The sprocket 57 is made relatively large to facilitate this initial portion of the stretch. As each spring cord in the series is carried by the first stretching conveyor 51 to the vicinity of the first transfer wheel 52, one of a plurality of pins 70—70 extending outward from the transfer wheel 52 crosses the path of the stretched cord and engages the cord at a second intermediate point therealong. The operative pin 70 functions to pick the cord off of the operative one of the fingers 68—68.

Figures 9, 10:
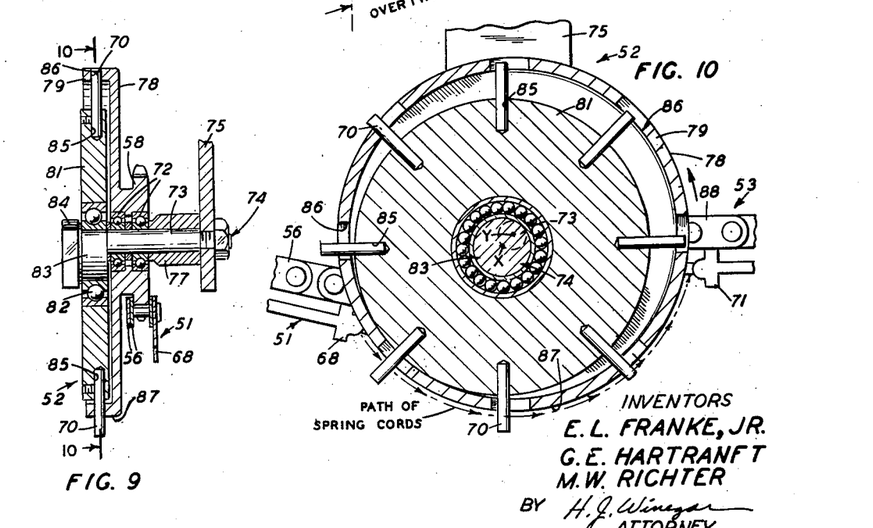
FIG. 9 is an enlarged vertical section, taken generally along line 9—9 of FIG. 5, and illustrating a transfer wheel forming part of the apparatus.
FIG. 10 is a vertical section through the transfer wheel, taken along the line 10—10 of FIG. 9.

As viewed in FIGS. 5 and 10, the transfer wheel 52 rotates in a counterclockwise direction so that the contacting pin 70 carries the spring cord for approximately 120° around the periphery of the wheel 52, away from the first stretching conveyor 51 to a position where the cord may be engaged at a third intermediate point therealong by one of a plurality of travelling fingers 71—71 of the second stretching conveyor 53. The outer diameter of the transfer wheel 52 is such that the lowest surface thereof extends further downward than either of the conveyors 51 and 53, so that the spring cords are rapidly stretched additionally during the first portion of their travel around the transfer wheel 52.

As viewed in FIGS. 4 and 6, the transfer wheel 52 is mounted in a different vertical plane from that of the stretching conveyors 51 and 53, so that different intermediate points along the cord are engaged by each of these units and the transfer operation between the conveyors 51 and 53 is accomplished smoothly. Since the pins 70—70 pick the spring cords off of the fingers 68—68, there is no possibility of the cords being carried upward by the conveyor 51 after the chain 56 passes around the sprocket wheel 58. Further, the pins 70—70 of the transfer wheel 52 are retracted into the wheel in the vicinity of the conveyor 53 so as to preclude the spring cords from being carried around the transfer wheel 52.

A preferred construction for the transfer wheel 52 and a drive therefor will now be described in detail, with particular reference being directed to FIGS. 9 and 10. As illustrated in FIG. 9, the sprocket 58 of the conveyor 51 is mounted in bearings 72—72 for free rotation about a small-diameter portion 73 of a fixed shaft, designated generally by the numeral 74. The right end of the shaft 74 (FIG. 9) is threaded, and is bolted to a depending plate 75 of a supporting structure, designated generally by the numeral 76. The structure 76 is illustrated in FIGS. 4, 5 and 6, and is designed for supporting the various motors and sprockets of the clamp-rotating means 17 and the stretching mechanism 18. A spacer 77 is positioned between the plate 75 and the sprocket 58 to permit free rotation of the sprocket 58 on the shaft 74.

The transfer wheel 52 includes a driven, outer wheel 78 having a circular flange 79 formed around the periphery thereof and projecting toward the left, as viewed in FIG. 9. While it would be possible to drive the outer wheel 78 independently of the conveyor 51 if desired, it has been found expedient to drive the outer wheel 78 from the sprocket 58 of the conveyor 51. For this purpose, the outer wheel 78 is formed as an integral part of the sprocket 58, so that the outer wheel 78 rotates freely as a part of the sprocket 58 about the small-diameter portion 73 of the shaft 74.

An inner wheel 81 is mounted eccentrically within the flange 79 of the outer wheel 78 for constrained rotation about the fixed shaft 74. For this purpose, the inner wheel 81 is journalled in a bearing 82 for free rotation about a large-diameter portion 83 of the shaft 74. The large-diameter portion 83 extends to the left of the small-diameter portion 73, as viewed in FIG. 9, and is eccentric with respect thereto, as illustrated in FIGS. 9 and 10. Thus, the inner wheel 81 rotates about a center X, while the outer wheel 78 rotates about a center Y. An enlarged end portion 84 (FIGS. 5 and 9) of the shaft 74 serves to retain the inner wheel 81 on the shaft 74.

The pins 70—70 are secured to the inner wheel 81 and project outward therefrom at intervals around the periphery thereof. As illustrated in FIG. 10, there are eight pins 70—70 provided at 45° intervals around the inner wheel 81. The pins 70—70 are provided with threaded inner ends, which are received within tapped bores 85—85 in the periphery of the wheel 81. Each pin 70 projects outward from the wheel 81 exactly the same distance. While more or less than eight pins might be provided, it has been found that this number is sufficient to transfer each spring cord from the conveyor 51 to the conveyor 53 without undue time loss in the cycle.

Each of the pins 70—70 is received within a corresponding slot 86 formed in the flange 79 of the outer wheel 78 and may project outward therethrough beyond the outer surface 87 of the flange 79 during certain portions of each complete rotation of the wheel 52. The slots 86—86 are centered at 45° intervals around the flange 79 so as to correspond to the spacing of the pins 70—70.

As illustrated in FIG. 10, the center X of the inner wheel 81 is displaced along a 45° angle downwardly from and to the left of the center Y of the outer wheel 78, so that the maximum projection of the pins 70—70 beyond the surface 87 occurs along the lower-left 45° line and the minimum projection occurs along the upper-right 45° line. Due to the eccentric mounting of the wheels 78 and 81, the pins 70—70 retract gradually into the outer wheel 78 as they travel from the lower-left to the upper-right, and then project gradually outward again as they travel from the upper-right to the lower-left.

As viewed in FIG. 10, the outer surface of the inner wheel 81 is substantially flush with the inner surface of the flange 79 at the lower-left, while considerable space is left at the upper-right. The distance that the pins 70—70 project from the inner wheel is set so that the pins extend far enough outward beyond the surface 87 to pick up every advancing spring cord at the lower-left and carry the cord to a position near the right-horizontal. The diameter of the inner wheel is such, having regard to the length of the pins 70—70 and the diameter of the flange 79, that the pins 70—70 will be retracted entirely into the outer wheel 78 at the upper-right. With this arrangement, the spring cords will be picked up by the conveyor 53 and may not be carried around the transfer wheel 52. The outer diameter of the flange 79 is regulated by the amount of additional stretching desired as the spring cords travel around the wheel 52.

As previously mentioned, the speed of the first conveyor 51 is set so that the pins 70—70 of the transfer wheel 52 pick up each spring cord at about the time where the cord is half wound in the reverse direction. Between the point at the lower-left where the pins 70—70 pick up the cord and the bottom of the wheel 52, the cord is stretched additionally. Between the bottom of the wheel 52 and the point near the right-horizontal where the conveyor 53 picks up the spring cords, the cords are stretched by lessening amounts. The path of the spring cords approaching, travelling around, and leaving the transfer wheel 52 is indicated by a phantom line in FIG. 10.

Referring again to FIGS. 4, 5 and 6, the second stretching conveyor 53 is generally similar in construction to the first such conveyor 51, and includes an endless chain 88 passing in a continuous, closed path around each of three sprockets 89, 91 and 92. The sprocket 89 is positively driven from a constant-speed motor 93 through a gear box 94, and an output shaft 96 of the gear box 94, on which shaft the sprocket 89 is keyed. The motor 93, the gear box 94 and the various sprockets all depend from the supporting structure 76.

The motor 93 drives the sprocket 89 in a counterclockwise direction, as viewed in FIG. 5, so that the chain 88 travels in a counterclockwise direction around the sprockets 89, 91 and 92, with the lower run between the sprockets 91 and 92 being the operative or cord-engaging run. The fingers 71—71 project outward from the chain 88 to pick up the spring cords as they are released by the transfer wheel 52, and carry them to a position near the second transfer wheel 54. The lower peripheries of the sprockets 91 and 92 are in horizontal alignment, so that the operating run of the conveyor 53 passes in a straight horizontal line and the length of the spring cord is maintained substantially constant (less than the maximum stretching accomplished by the transfer wheel 52) while engaged by the fingers 71—71 of the conveyor 53. For this purpose, the speed of the motor 93 is so synchronized with the speed of the main-conveyor motor 28 that the speed of advancement of the fingers 71—71 is substantially equal to the speed of the end clamps 11—11.

The second transfer wheel 54 is substantially the same in both construction and operation as the first such wheel 52, described hereinbefore and illustrated in detail in FIGS. 9 and 10. The wheel 54 includes a plurality of pins 97—97, which are extended beyond the periphery of the transfer wheel 54 at the lower-left in FIG. 5 to pick the spring cords off of the fingers 71—71 of the conveyor 53 and carry the cords around the transfer wheel 54. Since the bottom of the wheel 54 extends a substantial distance below the under surface of the conveyor 53, the spring cords are stretched additionally for a short time after they are picked up by the pins 97—97.

The motor speeds are so adjusted that the spring cords are picked up by the transfer wheel 54 at approximately the time that the overtwisting begins, and the cords are retained by the wheel 54 during the entire overtwisting operation. The overtwisting operation corresponds in time to about 90° of revolution of the transfer wheel 54. By the time that the spring cords reach a position along approximately the lower-right 45° line of the transfer wheel 54, the pulleys 37—37 (FIG. 4) at the ends of the clamps 11—11 pass out of engagement with the driving belts 37 and 38 and 43 and 44, and the overtwisting step is completed.

After this, pins 97—97 are retracted into the transfer wheel 54 to release the spring cords 10—10. The released cords remain against the outer surface of the transfer wheel 54 until the conveyor 15 advances the clamped ends of the cords into vertical alignment with the released central portion, after which the spring cords spring back into substantially horizontal positions and are carried by the clamps 11—11 to subsequent cord-working stations (not shown).

In order to provide additional support for the spring cords and in order to reduce vibration thereof during the helix-reversing and overtwisting operations, a first pair of camming bars 98—98 are provided. As viewed in FIG. 6, the camming bars 98—98 depend from the supporting structure 76 and are positioned one on each side of the stretching mechanism 18 so as to engage portions of the spring cords during the entire time that the cords are stretched by the various units 51, 52, 53 and 54 making up the stretching mechanism 18. As viewed in FIG. 5, the camming bars 98—98 have contoured undersurfaces which are substantially parallel to, but above, the path of the lowest portions of the cords, which path is governed by the shapes of the units 51, 52, 53 and 54. With this construction, the cords ride along the undersurfaces of the camming bars 98—98 and are deformed thereby into a bent configuration.

The primary purpose of the camming bars 98—98 is to prevent undue vibration or circular movement of those portions of the cords that extend between the stretching mechanism 18 and the clamps 11—11 at any time. Such vibration or circular movement has been found to present a very serious problem when the ends of a cord are rotated fairly rapidly and the majority of the cord length is unsupported between the ends and the stretching points. In particular, great difficulty has been experienced in getting the cords to rewind smoothly in the opposite direction, beginning at the clamped ends and then working toward the middle, without additional support being provided along the length of the cords. The camming bars 98—98 also function, by flattening out the curve of the cords, to prevent the cords from being wedged between the transfer wheels 52 and 54 and the stretching conveyors 51 and 53.

A second pair of camming bars 99—99 is also provided, and the bars 99—99 are designed to engage and support the spring cords near the end clamps 11—11 during the first few revolutions of the clamps at the start of the helix-reversing operation. As viewed in FIG. 6, the spring cords ride on a smooth upper surface of the camming bars 99—99 so that portions of the cords extend nearly horizontally between the clamps 11—11 and the camming bars 99—99. The camming bars 99—99 serve to prevent vibration or circular movement of the cords at the start of the helix-reversing operation.

When the bars 99—99 are utilized, it has been found that the reversing operation starts smoothly; that is, that the convolutions begin rewinding, in order, proceeding from the end clamps 11—11 toward the center, and there is no tangling or winding of the coils one one top of the other. As shown in FIGS. 4 and 5, the bars 99—99 terminate after the first few convolutions have been reversed. There has been found to be no necessity for providing such members after the point where the portions of the cord in engagement therewith have been reversed.

*Modified Embodiment*

Figure 11:
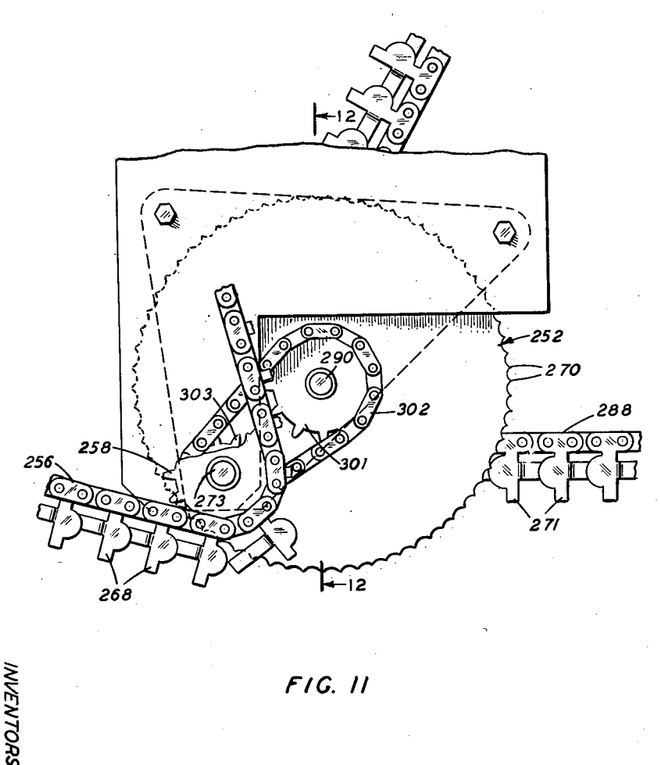
FIG. 11 is a fragmentary, vertical section of a portion of a stretching mechanism forming a modified embodiment of the invention.
Figure 12:
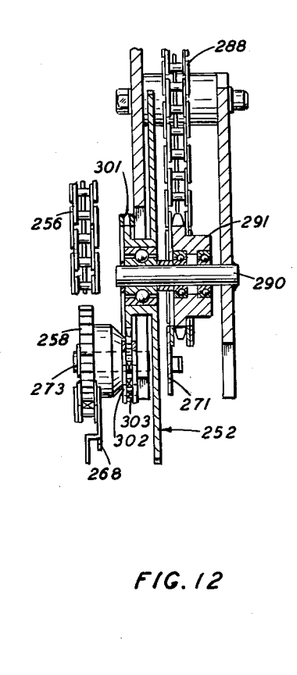
FIG. 12 is a fragmentary, vertical section taken along line 12—12 of FIG. 11.

Referring now to FIGS. 11 and 12, there is shown a modification of the spring-cord working machine disclosed in FIGS. 4 to 10, inclusive. In the modified embodiment of the invention, a transfer disc, designated generally by the numeral 252, has been substituted for the transfer wheel 52 of the first-described embodiment. The periphery of the transfer disc 252 is scalloped to provide a plurality of equally circumferentially spaced projections 270—270. The transfer disc 252 is mounted for rotation on a shaft 290. A sprocket 291, corresponding to the sprocket 91 associated with the chain 88 of the first-described embodiment, is also mounted on the shaft 290 for rotation and is similarly associated with a chain 288, corresponding to the chain 88 of the first-described embodiment.

A sprocket 301 is mounted rotatably on the shaft 290, and is attached fixedly to the transfer disc 252 for rotation therewith. The sprocket 301 is driven rotatably about the shaft 290 by an endless chain 302 driven from a sprocket 303 which is mounted rotatably on a shaft 273. A sprocket 258, which corresponds to the sprocket 58 of the first-described embodiment, is also mounted rotatably on the shaft 273 and is driven by a chain 256, corresponding to the chain 56 of the first-described embodiment. The train ratio of the chain-and-sprocket transmission, formed by sprockets 301 and 303 and the chain 302, is such that the tangential velocity of the projections 270—270 is substantially equal to the linear speed of fingers 268—268 on the chain 256, to ensure a smooth transfer of spring cords from the fingers to the projections on the transfer disc 252.

In the operation of the modified embodiment, the spring cords are disengaged from the fingers 268—268 on the chain 256 at approximately the point whereat 1.25 total revolutions have been imparted to the spring cords. The spring cords are engaged at this point by the projections 270—270 of the transfer disc 252, and are carried by the latter to the chain 288, whereupon fingers 271—271 on the chain 288 engage the spring cords. The linear speed of the chain 256 is adjusted to ensure the transfer of the spring cords from the fingers 268—268 to the projections 270—270 on the transfer disc 252 at the point where approximately 1.25 total revolutions have been imparted to the spring cords.

It may be seen that the stretching caused by the transfer disc 252 is obviously of a lesser degree than that produced by the transfer wheel 52 in the first-described embodiment, and that the increase and decrease in the stretching of the spring cords produced by the transfer disc 252 is less abrupt. In the particular example given, the increased length imparted to the spring cord by the transfer disc 252 is approximately 3%.

While specific embodiments of methods and apparatus according to the invention have been described in detail heerinabove, it will be obvious that various modifications may be made from the specific details described without departing from the spirit and scope of the invention.

What is claimed is:

1. In the method of reversing and overtwisting a spring cord having a coiled portion of a predetermined initial relaxed length formed from elastic-jacketed cordage wound into a helix of N coils and set in the helical form, including the steps of gripping opposite ends of a spring cord, reversing the helix of the coiled portion to the extent that the direction of all of the coils thereof are reversed by twistingly rotating one end relative to the other for a total of 2N revolutions in the same direction as the pitch of the helix, and thereafter overtwisting the spring cord by continuing the relative rotation of the ends to form additional coils of the reversed direction in the coiled portion, the improvement which comprises progressively stretching the coiled portion during at least the first approximately N to 1.25N revolutions of the helix-reversing step so that the length of said coiled portion increases uniformly to a first stretched length, immediately thereafter stretching the coiled portion to a second stretched length substantially greater than said first stretched length during a minor portion of the remaining revolutions of the helix-reversing step, then reducing the stretch of the coiled portion to a third stretched length substantially greater than said initial relaxed length but no greater than said first stretched length during the completion of the helix-reversing step, and then rapidly stretching the coiled portion to a length substantially greater than said third stretched length during the overtwisting step.

2. In combination with a helix-reversing and overtwisting apparatus of the type wherein a pair of clamps secure opposite ends of a spring cord, the clamps are advanced to carry the cord transversely of its length along a definite path, and relative rotation is effected between the advancing clamps along a portion of the path so as to reverse the helix of the cord and overtwist the same; an improved mechanism for stretching the cord, which comprises a first stretching conveyor having a finger projecting therefrom designed for engaging a first intermediate portion along the cord before the start of the helix-reversing operation and for maintaining engagement therewith during a first substantial portion of the helix-reversing operation, said first conveyor being arranged so that the finger crosses the path of the cord and travels at an acute angle with respect to the direction of advancement of the clamps so as to pull the intermediate portion of the cord away from the clamped ends thereof to stretch the cord into a curved path of progressively increasing length; a second stretching conveyor having a finger projecting therefrom designed for engaging a second intermediate portion along the cord and maintaining engagement therewith during the remainder of the helix-reversing operation, said second conveyor being arranged so that the finger thereof travels in a direction parallel to the direction of advancement of the clamps; and a transfer wheel designed for picking the cord off of said second conveyor at approximately the point where the overtwisting operation starts, for stretching the cord additionally during the major portion of the overtwisting operation, and for releasing the cord after the overtwisting operation.

3. In combination with a helix-reversing and overtwisting apparatus of the type wherein a pair of clamps secure opposite ends of a spring cord, the clamps are advanced to carry the cord transversely of its length along a definite path, and relative rotation is effected between the advancing clamps along a portion of the path so as to reverse the helix of the cord and overtwist the same; an improved mechanism for stretching the cord which comprises a first stretching conveyor having a finger projecting therefrom designed for engaging a first intermediate portion along the cord before the start of the helix-reversing operation and for maintaining engagement therewith during a first substantial portion of the helix-reversing operation, said first conveyor being arranged so that the finger crosses the path of the cord and travels at an acute angle with respect to the direction of advancement of the clamps so as to pull the intermediate portion of the cord away from the clamped ends thereof to stretch the cord into a curved path of progressively increasing length; means for driving said first conveyor at such a speed that the speed component of the finger thereof in the direction of advancement of the clamps is greater than the speed of the clamps, so that the first intermediate portion of the cord leads the clamped ends thereof by progressively increasing amounts during the interval of engagement with said first conveyor; a first transfer wheel having a pin projecting therefrom designed for engaging a second intermediate portion along the cord so as to pick the cord off of said first conveyor and later release the cord after stretching the cord additionally to a maximum length during the interval of engagement with the cord; a second stretching conveyor having a finger projecting therefrom designed for engaging a third intermediate portion along the cord as the cord is released by said first transfer wheel and for maintaining engagement therewith during the remainder of the helix-reversing operation; means for driving said second conveyor at such a speed that the finger thereof travels at substantially the same speed as the clamps so that the cord is stretched by a substantially constant amount during the interval of engagement with said second conveyor; and a second transfer wheel having a pin projecting therefrom designed for engaging a fourth intermediate portion along the cord so as to pick the cord off of said second conveyor at approximately the point where the overtwisting operation starts and later release the cord after the overtwisting operation while stretching the cord additionally during the major portion of the overtwisting operation, the speed of said means for driving said first conveyor being set at such a value that the cord reaches said second transfer wheel at approximately the start of the overtwisting operation.

References Cited in the file of this patent

UNITED STATES PATENTS

| | | |
|---|---|---|
| 2,268,891 | Mueller | Jan. 6, 1942 |
| 2,491,528 | Spinner | Dec. 20, 1949 |
| 2,575,747 | Cook | Nov. 20, 1951 |
| 2,815,672 | Storer | Dec. 10, 1957 |
| 2,878,514 | Nichols et al. | Mar. 24, 1959 |
| 2,920,348 | Franke | Jan. 12, 1960 |
| 2,920,351 | Hardesty et al. | Jan. 12, 1960 |